(12) United States Patent
Wang et al.

(10) Patent No.: US 12,019,990 B2
(45) Date of Patent: Jun. 25, 2024

(54) REPRESENTATION LEARNING METHOD AND DEVICE BASED ON NATURAL LANGUAGE AND KNOWLEDGE GRAPH

(71) Applicant: BEIJING BAIDU NETCOM SCIENCE TECHNOLOGY CO., LTD., Beijing (CN)

(72) Inventors: Haifeng Wang, Beijing (CN); Wenbin Jiang, Beijing (CN); Yajuan Lv, Beijing (CN); Yong Zhu, Beijing (CN); Hua Wu, Beijing (CN)

(73) Assignee: BEIJING BAIDU NETCOM SCIENCE TECHNOLOGY CO., LTD. (CN)

( * ) Notice: Subject to any disclaimer, the term of this patent is extended or adjusted under 35 U.S.C. 154(b) by 722 days.

(21) Appl. No.: 17/124,030

(22) Filed: Dec. 16, 2020

(65) Prior Publication Data
US 2021/0192364 A1    Jun. 24, 2021

Related U.S. Application Data

(63) Continuation of application No. PCT/CN2020/095108, filed on Jun. 9, 2020.

(30) Foreign Application Priority Data

Dec. 17, 2019  (CN) .................. 201911297702.X (51) Int. Cl.
*G06N 20/00* (2019.01)
*G06F 18/214* (2023.01)
(Continued)

(52) U.S. Cl.
CPC ............ *G06F 40/30* (2020.01); *G06F 18/214* (2023.01); *G06F 18/24147* (2023.01); *G06F 40/279* (2020.01); *G06N 5/022* (2013.01)

(58) Field of Classification Search
CPC .. G06F 40/30; G06F 18/214; G06F 18/24147; G06F 40/279; G06F 18/2413;
(Continued)

(56) References Cited

U.S. PATENT DOCUMENTS

| | | | |
|---|---|---|---|
| 9,536,522 B1* | 1/2017 | Hall | G06F 16/3344 |
| 10,339,420 B1* | 7/2019 | Lecue | G06F 16/583 |

(Continued)

FOREIGN PATENT DOCUMENTS

| | | | |
|---|---|---|---|
| CN | 106649878 A | 5/2017 | |
| CN | 108073673 A | 5/2018 | |

(Continued)

OTHER PUBLICATIONS

Notice of Reason for Rejection in JP Patent Application No. 2020571787 dated Mar. 16, 2022.
(Continued)

*Primary Examiner* — Hien L Duong
(74) *Attorney, Agent, or Firm* — Dilworth IP, LLC (57) ABSTRACT

The present application discloses a text processing method and device based on natural language processing and a knowledge graph, and relates to the in-depth field of artificial intelligence technology. A specific implementation is: an electronic device uses a joint learning model to obtain a semantic representation, which is obtained by the joint learning model by combining knowledge graph representation learning and natural language representation learning, it combines a knowledge graph representation learning and a natural language representation learning, compared to using only the knowledge graph representation learning or the natural language representation learning to learn semantic representation of a prediction object, factors considered by the joint learning model are more in quantity and comprehensiveness, so accuracy of semantic representation can be
(Continued)

improved, and thus accuracy of text processing can be improved.

15 Claims, 5 Drawing Sheets

(51) Int. Cl.
*G06F 18/2413* (2023.01)
*G06F 40/279* (2020.01)
*G06F 40/30* (2020.01)
*G06N 5/022* (2023.01)

(58) Field of Classification Search
CPC .......... G06N 5/022; G06N 3/044; G06N 5/02; G06N 3/04; G06N 3/08; G06N 20/00
See application file for complete search history.

(56) References Cited

U.S. PATENT DOCUMENTS

| | | | |
|---|---|---|---|
| 10,706,084 B2 * | 7/2020 | Zhao | G06F 17/11 |
| 10,943,072 B1 * | 3/2021 | Jaganmohan | G06N 3/045 |
| 11,093,818 B2 * | 8/2021 | Li | G06N 3/044 |
| 11,474,836 B2 * | 10/2022 | Awadallah | G06N 20/00 |
| 2010/0250598 A1 | 9/2010 | Brauer et al. | |
| 2014/0236570 A1 * | 8/2014 | Heck | G06F 16/3329 704/9 |
| 2016/0098645 A1 * | 4/2016 | Sharma | G06N 7/01 706/12 |
| 2017/0228435 A1 | 8/2017 | Tacchi et al. | |
| 2019/0042988 A1 * | 2/2019 | Brown | G06F 9/547 |
| 2019/0213260 A1 | 7/2019 | Bacarella et al. | |
| 2019/0236205 A1 * | 8/2019 | Jia | G06F 16/3329 |
| 2020/0050605 A1 * | 2/2020 | Tung | G06F 16/9024 |
| 2020/0265324 A1 * | 8/2020 | Ferreira Moreno | G06N 5/022 |
| 2020/0364408 A1 * | 11/2020 | Lao | G06F 40/30 |
| 2021/0029003 A1 * | 1/2021 | Morman | H04L 41/0631 |
| 2021/0097096 A1 * | 4/2021 | Osmon | G06F 16/3329 |
| 2021/0109995 A1 * | 4/2021 | Mihindukulasooriya | G06F 40/247 |
| 2021/0279599 A1 * | 9/2021 | Carbune | G06F 40/35 |

FOREIGN PATENT DOCUMENTS

| | | |
|---|---|---|
| CN | 108256065 A | 7/2018 |
| CN | 108681544 A | 10/2018 |
| CN | 108829858 A | 11/2018 |
| CN | 109978060 A | 7/2019 |
| CN | 110083690 A | 8/2019 |
| CN | 110222162 A | 9/2019 |
| CN | 110727806 A | 1/2020 |
| JP | 2019511797 A | 4/2019 |
| KR | 20110064833 A | 6/2011 |
| KR | 101896973 B1 | 9/2018 |
| KR | 20190075067 A | 6/2019 |
| WO | 2017149559 A1 | 9/2017 |
| WO | 2019083519 A1 | 5/2019 |

OTHER PUBLICATIONS

Tian, Fei, Joint Learning Methods for Distributed Representations of Natural Language, University of Science and Technology of China, May 2016, pp. 1-124.
First Office Action in CN Patent Application No. 201911297702.X dated Feb. 19, 2020.
Second Office Action in CN Patent Application No. 201911297702.X dated Mar. 30, 2020.
Kumar, G. et al., AMUSED: A Multi-Stream Vector Representation Method for Use in Natural Dialogue, arxiv.org, Cornell University Library, 201 Olin Library Cornell University, Ithaca, NY 14853, Dec. 4, 2019, pp. 1-12.
Wang, X. et al., KEPLER: A Unified Model for Knowledge Embedding and Pre-trained Language Representation, arxiv.org, Cornell University Library, Cornell University, Ithaca, NY 14853, Nov. 13, 2019, pp. 1-10.
Maussallem, D. et al., Utilizing Knowledge Graphs for Neural Machine Translation Augmentation, Proceedings of the 10th International Conference on Knowledge Capture, AMCPUB27, New York, NY, Sep. 23, 2019, pp. 139-146.
European Search Report in EP Patent Application No. 20864301.5 dated Jan. 12, 2022.
International Search Report and Opinion in PCT/CN2020/095108 dated Aug. 27, 2020.
Notice of Allowance in KR Patent Application No. 10-2020-7036186 dated Mar. 30, 2023.
First Office Action in KR Patent Application No. 10-2020-7036186 dated Jun. 29, 2022.
Vashishth, S. et al., Incorporating Syntactic and Semantic Information in Word Embeddings using Graph Convolutional Networks, Indian Institute of Science, Microsoft Research, IIT Kanpur, Jun. 4, 2019, pp. 1-11.
Summons to attend oral proceedings pursuant to Rule 115(1) EPC in EP Patent Application No. 20864301.5 dated Apr. 30, 2024.

* cited by examiner

REPRESENTATION LEARNING METHOD AND DEVICE BASED ON NATURAL LANGUAGE AND KNOWLEDGE GRAPH

CROSS-REFERENCE TO RELATED APPLICATIONS

The present application is a continuation application of the International application PCT/CN2020/095108, filed on Jun. 9, 2020, entitled "REPRESENTATION LEARNING METHOD AND DEVICE BASED ON NATURAL LANGUAGE AND KNOWLEDGE GRAPH", which claims the priority of a Chinese Patent Application No. 201911297702X, entitled "TEXT PROCESSING METHOD AND DEVICE BASED ON NATURAL LANGUAGE AND KNOWLEDGE GRAPH" filed to the Chinese Patent Office on Dec. 17, 2019. The aforementioned patent applications are hereby incorporated by reference in their entireties.

TECHNICAL FIELD

Embodiments of the present application relate to the field of artificial intelligence (AI) technology, and more particularly, to a representation learning method and device based on a natural language and a knowledge graph.

BACKGROUND

At present, in order to obtain valuable information from massive data, the knowledge graph (KG) has emerged. At the same time, the natural language is used as a tool and a carrier for people to communicate and think. Representation of characters and words in the natural language is a basic processing object for language processing artificial intelligence tasks based on deep learning.

Under normal circumstances, the knowledge graph and the natural language are two independent fields, in both of which a technology system of representation learning has been independently developed. For knowledge graph representation learning, a co-occurrence law between point and an edge contained in a knowledge graph is modeled usually in a form of vector spatial operation to learn a knowledge graph semantic representation; for natural language representation learning, a co-occurrence law between words or sentences is modeled usually in a form of sequence generation to learn a natural language semantic representation.

However, the semantic representations learned based on the representation learning methods discussed above have poor accuracy, resulting in that when the semantic representations discussed above are used for text processing, the text processing has poor accuracy.

SUMMARY

The embodiments of the present application provide a representation learning method and device based on a natural language and a knowledge graph. By combining knowledge graph representation learning and natural semantics representation learning, a semantic representation with better quality can be learned to realize the purpose of improving the accuracy of text processing.

In the first aspect, an embodiment of the present application provides a text processing method based on a natural language and a knowledge graph, including: receiving a text processing request input by a user, where the text processing request is used to request that a text be processed according to a semantic representation of a prediction object in the text; inputting the prediction object to a pre-trained joint learning model to obtain the semantic representation of the prediction object, where the joint learning model is used for knowledge graph representation learning and natural language representation learning, and the semantic representation is obtained by the joint learning model by combining the knowledge graph representation learning and the natural language representation learning; and processing the text according to the semantic representation.

In a feasible design, before the receiving the text processing request input by the user, the method further includes: performing training on training samples to obtain the joint learning model, where the joint learning model includes a natural language learning layer, a joint learning correlation layer and a knowledge graph learning layer, and the joint learning correlation layer is used to correlate the knowledge graph learning layer with the natural language learning layer.

In a feasible design, the performing the training on the training samples to obtain the joint learning model includes: determining, at the natural language learning layer, a neighbor sample of a target training sample in the training samples; determining, at the joint learning correlation layer, a weight of the target training sample relative to each entity in the knowledge graph learning layer according to the neighbor sample; determining a knowledge graph semantic representation of the target training sample according to the weight of each entity; and determining a training result of the target training sample according to the knowledge graph semantic representation and the neighbor sample.

In a feasible design, the determining, at the joint learning correlation layer, the weight of the target training sample relative to each entity in the knowledge graph learning layer includes: for each entity in the knowledge graph learning layer, determining, at the joint learning correlation layer, M weights of the target training sample relative to the entity, where M≥1 and M is an integer.

In a feasible design, the determining the knowledge graph semantic representation of the target training sample according to the weight of each entity includes: for each entity in the knowledge graph learning layer, processing the knowledge graph semantic representation of the entity according to the weight corresponding to the entity to obtain multiple processed knowledge graph semantic representations; and determining the knowledge graph semantic representation of the target training sample according to the multiple processed knowledge graph semantic representations.

In a feasible design, after the determining the training result of the target training sample according to the knowledge graph semantic representation and the neighbor sample, further including: optimizing the knowledge graph semantic representation of each of multiple entities contained in the knowledge graph learning layer according to the training result.

In a feasible design, the optimizing the knowledge graph semantic representation of each of the multiple entities contained in the knowledge graph learning layer according to the training result includes: determining whether the training result is correct or not; generating an excitation signal if the training result is correct, and enhancing the knowledge graph semantic representation of each of the multiple entities contained in the knowledge graph learning layer according to the excitation signal; and generating a penalty signal if the training result is wrong, and adjusting the knowledge graph semantic representation of each of the multiple entities contained in the knowledge graph learning layer according to the penalty signal.

In the second aspect, an embodiment of the present application provides a text processing device based on a natural language and a knowledge graph, including: a receiving module, configured to receive a text processing request input by a user, where the text processing request is used to request that a text be processed according to a semantic representation of a prediction object in the text;

an acquiring module, configured to input the prediction object into a pre-trained joint learning model to obtain the semantic representation of the prediction object, where the joint learning model is used for knowledge graph representation learning and natural language representation learning, and the semantic representation is obtained by the joint learning model by combining the knowledge graph representation learning and the natural language representation learning; and a processing module, configured to process the text according to the semantic representation.

In a feasible design, the device discussed above further includes:

a training module, configured to: before the receiving module receives the text processing request input by the user, perform training on training samples to obtain the joint learning model, where the joint learning model includes a natural language learning layer, a joint learning correlation layer and a knowledge graph learning layer, and the joint learning correlation layer is used to correlate the knowledge graph learning layer with the natural language learning layer.

In a feasible design, the training module is configured to: determine, at the natural language learning layer, a neighbor sample of a target training sample in the training samples; determine, at the joint learning correlation layer, a weight of the target training sample relative to each entity in the knowledge graph learning layer according to the neighbor sample; determine a knowledge graph semantic representation of the target training sample according to the weight of each entity; and determine a training result of the target training sample according to the knowledge graph semantic representation and the neighbor sample.

In a feasible design, when determining, at the joint learning correlation layer, the weight of the target training sample relative to each entity in the knowledge graph learning layer, for each entity in the knowledge graph learning layer, the training module determines, at the joint learning correlation layer, M weights of the target training sample relative to the entity, where M≥1 and M is an integer.

In a feasible design, when determining the knowledge graph semantic representation of the target training sample according to the weight of each entity, for each entity in the knowledge graph learning layer, the training module processes the knowledge graph semantic representation of the entity according to the weight corresponding to the entity to obtain multiple processed knowledge graph semantic representations, and determines the knowledge graph semantic representation of the target training sample according to the multiple processed knowledge graph semantic representations.

In a feasible design, after determining the training result of the target training sample according to the knowledge graph semantic representation and the neighbor sample, the training module is further configured to optimize the knowledge graph semantic representation of each of the multiple entities contained in the knowledge graph learning layer according to the training result.

In a feasible design, the training module is specifically configured to: determine whether the training result is correct or not; generate an excitation signal if the training result is correct, and enhance the knowledge graph semantic representation of each of the multiple entities contained in the knowledge graph learning layer according to the excitation signal; and generate a penalty signal if the training result is wrong, and adjust the knowledge graph semantic representation of each of the multiple entities contained in the knowledge graph learning layer according to the penalty signal.

In the third aspect, an embodiment of the present application provides an electronic device, including:

at least one processor; and a memory communicatively connected with the at least one processor;

where the memory is stored with instructions executable by the at least one processor, and the instructions are executed by the at least one processor to enable the at least one processor to execute the method in the first aspect or any possible implementation of the first aspect.

In the fourth aspect, an embodiment of the present application provides a computer program product containing instructions which, when operated on an electronic device, enable the electronic device to execute the method discussed above in the first aspect or any possible implementation of the first aspect.

In the fifth aspect, an embodiment of the present application provides a storage medium, where the storage medium has stored therein instructions which, when operated on an electronic device, enable the electronic device to execute the method discussed above in the first aspect or any possible implementation of the first aspect.

An embodiment of the application discussed above has the following advantages or beneficial effects: after receiving a text processing request input by a user, an electronic device inputs a prediction object in the text to a pre-trained joint learning model to learn a semantic representation of the prediction object, where the semantic representation is obtained by the joint learning model by combining knowledge graph representation learning and natural language representation learning, then the electronic device processes the text according to the semantic representation. In this process, since the semantic representation obtained by the electronic device using the joint learning model is obtained by the joint learning model by combining knowledge graph representation learning and natural language representation learning, it combines a knowledge graph representation learning and a natural language representation learning, compared to using only the knowledge graph representation learning or the natural language representation learning to learn the semantic representation of the prediction object, factors considered by the joint learning model are more in quantity and comprehensiveness, so accuracy of semantic representation can be improved, and thus accuracy of text processing can be improved.

Other effects of the optional implementations discussed above will be described below in conjunction with specific embodiments.

BRIEF DESCRIPTION OF DRAWINGS

The drawings are used to better understand the solution and do not constitute a limitation to the present application. Among them.

DESCRIPTION OF EMBODIMENTS

Exemplary embodiments of the present application will be explained hereunder with reference to the accompanying drawings, which includes therein various details of the embodiments of the present application to facilitate understanding, and should be considered as merely exemplary. Therefore, those of ordinary skill in the art should recognize that various changes and modifications can be made to the embodiments described herein without departing from the scope and spirit of the present application. Likewise, for clarity and conciseness, descriptions of well-known functions and structures are omitted in the following description.

Generally speaking, knowledge graph and natural language processing are two independent fields. In both of them, an independent representation learning systems has been developed. The representation learning technologies in the fields follow different modeling methods and optimization goals, and there is no cross fusion. For the knowledge graph representation learning, a co-occurrence law between a point and an edge is modeled usually in a form of vector spatial operation, while for the natural language representation learning, a co-occurrence law between words or sentences is modeled usually in a form of sequence generation.

Although there is currently a method for improving language representation learning by means of named entity information in the field of natural language, this method is regarded as a preliminary version for introducing knowledge in the natural language representation learning, but this method adopts a multilayer self-attention neural network as the learning model, and uses word and sentence co-occurrence tasks such as cloze and adjacent sentence pair judgment as learning goals. A specific way for introducing knowledge according to this method is: performing bound treatment on a sequence of corresponding words in a natural language sentence according to a named entity dictionary, participating in a language representation learning process as a unified processing object, where the so-called bound treatment means that if a word has a corresponding entity in the named entity dictionary, then the word is treated as an entirety which is unseparable. For example, the word is added with brackets to indicate that the word is an entity and cannot be split. In this way, the effect of improving natural language representation learning by means of named entity dictionary knowledge can be achieved. Multiple entities are recorded in the named entity dictionary, which can be regarded as a list of entities and can be obtained according to a knowledge graph or by collecting the entities.

The improvement of natural language representation learning by means of the named entity dictionary knowledge discussed above is a very preliminary way of using external knowledge. However, this method can assist the natural language representation learning by means of the external knowledge, but it is impossible that the external knowledge graph representation learning is assisted by means of the natural language.

From the perspective of natural language representation learning, the method of improving natural language representation learning by means of named entity dictionary knowledge discussed above also has two defects: Defect 1. In terms of knowledge application range, only the named entity dictionary is used to determine whether a character or a word has a corresponding entity or not. Specifically, the knowledge graph contains not only a large number of points, but also edges, as well as a topological structure formed by points and edges, however, the method discussed above uses the only information that whether a word or a character is an entity or not; Defect 2. In terms of knowledge application means, the method discussed above uses the natural language representation learning as a basic framework, on the basis of that, it is determined whether a word or a character is an entity according to a list of entities provided by the named entity dictionary, information flow in this method is one-way, from the external knowledge, i.e., the named entity dictionary, to the natural language, a two-way correspondence rule between the natural language and the external knowledge cannot be effectively used.

Given this, the embodiments of the present application provide a text processing method and device based on a natural language and a knowledge graph. By combining knowledge graph representation learning and natural semantics representation learning, a semantic representation of better quality can be learned.

Hereinafter, the terms involved in the embodiments of the present application will be explained.

First, the knowledge graph.

In the embodiment of the present application, the knowledge graph is composed of points and edges in a form of graph, which is a structured representation form of knowledge. Information represented by the points of the knowledge graph includes but is not limited to, entities, concepts, interests and events, which correspond to specific types of knowledge graphs such as concept graphs, interest graphs, and event graphs, respectively; accordingly, information representable by the edges includes but is not limited to attributes, subordination, timing sequence and causality, etc. Semantic representations of the points and the edges of the knowledge graph can be used for artificial intelligence tasks such as knowledge base completion, knowledge base question answering, intelligent recommendation, event analysis, language comprehension, and machine translation.

Secondly, the natural language learning.

In the embodiment of the present application, the natural language is composed of characters or words in a form of sequence, which is a tool and a carrier for people to communicate and think and can be used for, through text processing, cognitive intelligence tasks such as reading comprehension, intelligent question-answering, machine translation, and automatic writing, etc.

In the embodiment of the present application, a joint learning model is obtained by the electronic device by performing joint modeling on knowledge graph representation learning and natural language representation learning processes and introducing, in the modeling process, a correlation between entities constituting the knowledge graph and words constituting the natural language, a better knowledge graph semantic representation and natural language semantic representation are learned based on the joint learning model. The electronic device is, for example, a server or a terminal device.

Figure 1:
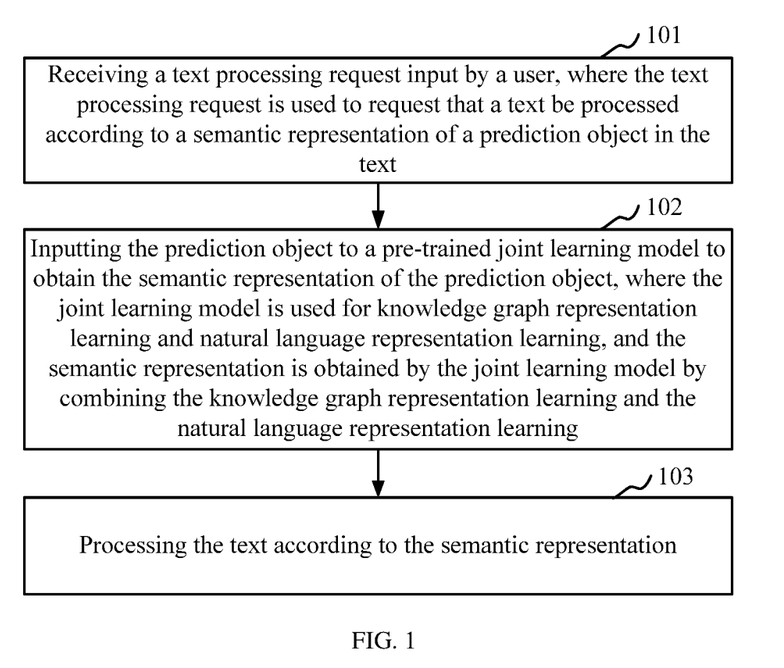
FIG. 1 is a flowchart of a text processing method based on a natural language and a knowledge graph according to an embodiment of the present application.

FIG. 1 is a flowchart of a text processing method based on a natural language and a knowledge graph according to an embodiment of the present application. The present embodiment is described from the perspective of electronic device, and the present embodiment includes:

101, receiving a text processing request input by a user, where the text processing request is used to request that a text be processed according to a semantic representation of a prediction object in the text.

Exemplarily, a joint learning model is pre-loaded on the electronic device, and when text processing is required, the user inputs a processing request to the electronic device by means of a click operation, a touch operation, or a voice input, and the electronic device receives and recognizes the text processing request.

For example, when the joint learning model is used to assist a cognitive intelligence task, the electronic device performs zoned processing or others to a pending text after receiving the text processing request, and the text is split into individual words or characters, where the individual words or characters are prediction objects.

For another example, when the joint learning model is used to assist a knowledge graph task, the electronic device recognizes entities contained in the pending text after receiving the text processing request, and these entities are prediction objects.

102, inputting the prediction object to a pre-trained joint learning model to obtain the semantic representation of the prediction object, where the joint learning model is used for knowledge graph representation learning and natural language representation learning, and the semantic representation is obtained by the joint learning model by combining the knowledge graph representation learning and the natural language representation learning.

Exemplarily, for each prediction object, the electronic device inputs the prediction object into the joint learning model to obtain a semantic representation of the prediction object. For example, when the prediction object is a word or a character, the joint learning model outputs a natural language semantic representation; for another example, when the prediction object is an entity, the joint learning model outputs a knowledge graph semantic representation.

In the present embodiment, the semantic representation output by the joint learning model, either the knowledge graph semantic representation or the natural language semantic representation, is obtained by the joint learning model by combining knowledge graph representation learning and natural language representation learning in advance. That is to say, when the electronic device performs training on the joint learning model, for a training sample which is a word or a character, in addition to a neighbor training sample of the training sample, knowledge graph information of the training sample is also considered during the training process. Moreover, the training result of the training sample is also used to adjust the knowledge graph semantic representation of each entity in the knowledge graph, so that the training result of the training sample in the natural language processing is taken into account for the semantic representation of each entity in the knowledge graph, in addition to other entities in the knowledge graph.

103, processing the text according to the semantic representation.

Exemplarily, after obtaining the semantic representation of each prediction object in the pending text, the electronic device processes the text according to these semantic representations. For example, when the joint learning model is used to assist a cognitive intelligence task, the electronic device performs reading comprehension, intelligent question-answering, machine translation, or automatic writing according to the semantic representation. For another example, when the joint learning model is used to assist a knowledge graph task, the electronic device performs knowledge base completion, knowledge base reasoning, and knowledge base question answering according to the semantic representation.

In the text processing method based on the natural language and the knowledge graph according to the embodiment of the present application, after receiving a text processing request input by a user, an electronic device inputs a prediction object in the text to a pre-trained joint learning model to learn a semantic representation of the prediction object, where the semantic representation is obtained by the joint learning model by combining knowledge graph representation learning and natural language representation learning, then the electronic device processes the text according to the semantic representation. In this process, since the semantic representation obtained by the electronic device using the joint learning model is obtained by the joint learning model by combining knowledge graph representation learning and natural language representation learning, it combines a knowledge graph representation learning and a natural language representation learning, compared to using only the knowledge graph representation learning or the natural language representation learning to learn the semantic representation of the prediction object, factors considered by the joint learning model are more in quantity and comprehensiveness, so accuracy of semantic representation can be improved, and thus accuracy of text processing can be improved.

In the above embodiment, before receiving the text processing request input by the user, the electronic device also performs a training on the training sample to obtain the joint learning model discussed above, which includes three core modules: a natural language learning layer and a joint learning correlation layer, and a knowledge graph learning layer, where the joint learning correlation layer is used to correlate the knowledge graph learning layer with the natural language learning layer. Exemplarily, reference may be made to FIG. 2, which is a schematic structural diagram of a joint learning model applicable to the text processing method based on the natural language and the knowledge graph according to an embodiment of the present application.

Figure 2:
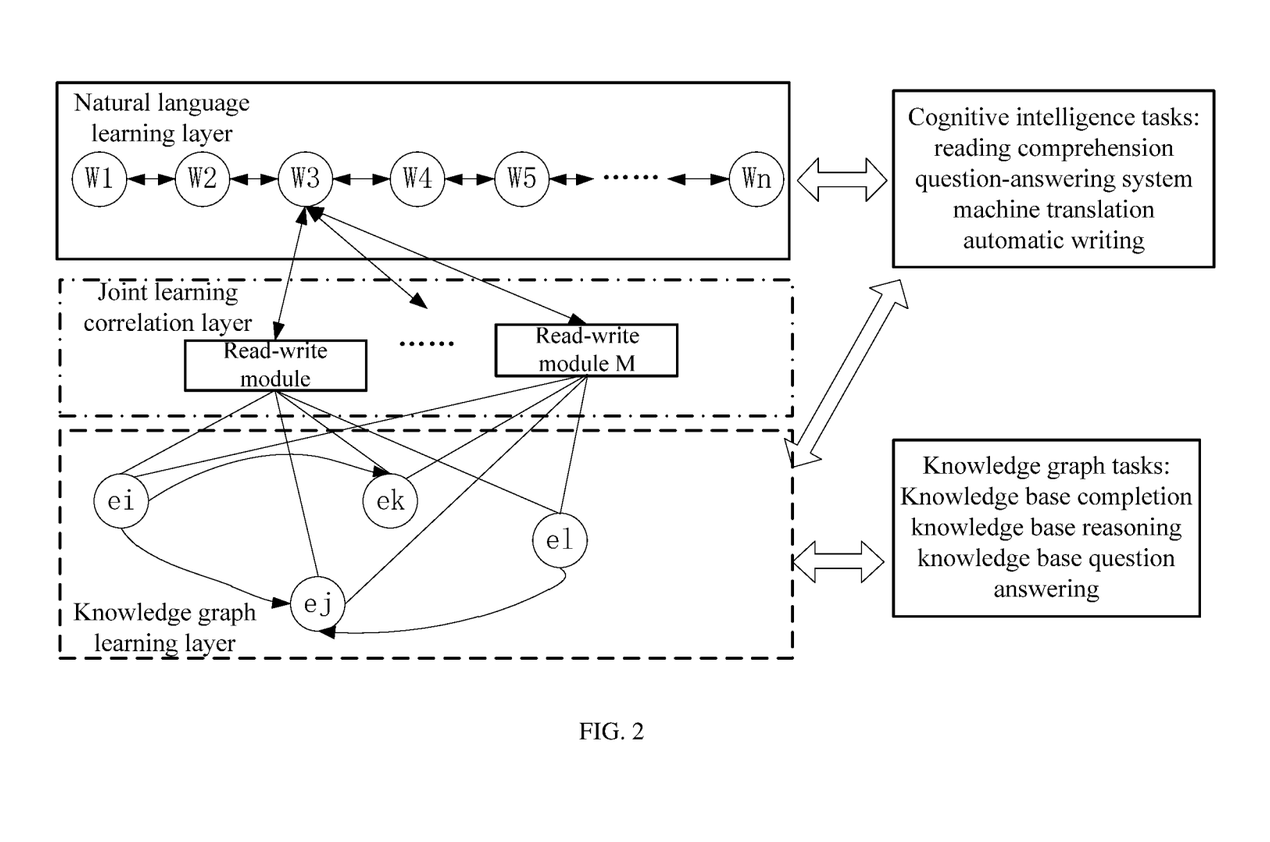
FIG. 2 is a schematic structural diagram of a joint learning model applicable to the text processing method based on the natural language and the knowledge graph according to the embodiment of the present application.

Please refer to FIG. 2, the joint learning model includes a natural language learning layer, a joint learning correlation layer and a knowledge graph learning layer, which correspond to corresponding sub-neural network models, respectively. The knowledge graph learning layer and the natural language learning layer cooperate through the joint learning correlation layer, a variety of neural network mechanisms can be used for the cooperation mechanism. In addition, the joint learning model also includes learning modules for other tasks, which are used to drive the knowledge graph representation learning and the natural language representation learning.

Please refer to FIG. 2, the solid-line block shows the natural language learning layer. Various mainstream neural network language models can be used, such as a Recurrent Neural Network (RNN) model, a Long Short-Term Memory (LSTM) model, a transformer model, Bidirectional Encoder Representations from Transformers (BERT) and Enhanced Representation through kNowledge IntEgration (ERNIE), etc. The essence of the natural language learning layer is to transfer information between sentences and words, and to model a relationship between words, so as to achieve the effect of learning word representation.

Please refer to FIG. 2, the dashed line block shows the knowledge graph learning layer. Graph neural networks can be used to better reflect the topological structure of the knowledge graph. In addition, the knowledge graph learning layer may not use any model, but only regard the knowledge graph as a list of points and edges.

Please refer to FIG. 2, the dot-dash line shows the joint learning correlation layer, which is composed of one or more read write mechanisms. The role of the joint learning correlation layer is to establish correlation between words and knowledge to realize information transfer between a sentence in the natural language and a knowledge base of the knowledge graph. The input of the read write mechanism of the joint learning correlation layer is usually a word or a character in the natural language learning layer and a knowledge graph in the knowledge graph learning layer, where the word or the character is a neighbor sample of the target training sample, for example, the training samples include words or characters in the quantity of n, such as word 1 (word 1, w1) ~wn in the figure, assuming that the target training sample is w3, then the neighbor samples of w3 are inputted, such as w1, w2, w4, w5, etc., and the knowledge graph, the joint learning correlation layer obtains a knowledge graph semantic representation of the target training sample according to the input and outputs it. After that, the natural language learning layer obtains the training result of the target training sample according to the knowledge graph semantic representation and the neighbor training sample of the target training sample.

In the present embodiment, the purpose of obtaining, through training, the joint learning model for the knowledge graph representation learning and the natural language representation learning is achieved.

In the embodiments discussed above, when the electronic device obtains the joint learning model by performing training on the training samples, the natural language learning layer can be improved by means of the knowledge graph learning layer, after that, the knowledge graph learning layer can be improved by means of the natural language learning layer. The two aspects will be described in details.

First, improve the natural language learning layer by means of the knowledge graph learning layer.

In a feasible design, when performing the training on the training samples to obtain the joint learning model, the electronic device determines, at the natural language learning layer, a neighbor sample of a target training sample in the training samples, determines, at the joint learning correlation layer, a weight of the target training sample relative to each entity in the knowledge graph learning layer according to the neighbor sample, determines a knowledge graph semantic representation of the target training sample according to the weight of each entity, and determines a training result of the target training sample according to the knowledge graph semantic representation and the neighbor sample.

Exemplarily, please refer to FIG. 2, the training samples include w1~wn. An example is taken where w3 is used as the target training sample, in the traditional training process, when w3 is the target training sample, the training results of other training samples apart from w3 are known by default, and it is necessary to use the known training results to predict the training result of w3. In the prediction process, the electronic device mainly uses the training results of the neighbor samples of w3, such as w1, w2, w4, and w5. In the embodiment of the present application, when w3 is the target training sample, the training results of other training samples apart from w3 are known by default. When the electronic device predicts the training result of w3, in addition to using the training results of w1, w2, w4, w5, which are neighbor samples of w3, the knowledge graph semantic representation of w3 also needs to be considered.

In the embodiment of the present application, the knowledge graph semantic representation of w3 can be obtained based on the neighbor samples of w3. For example, the electronic device integrates the neighbor samples of w3, which are w1, w2, w4, w5, etc. to obtain integrated information, inputs the integrated information to the joint learning correlation layer, determines, at the joint learning correlation layer, a weight of the integrated information relative to each entity (abbreviated as e, such as ei, ej, ek, and el) in the knowledge graph learning layer, and determines a knowledge graph semantic representation of the target training sample according to the five weights and the knowledge graph semantic representation of each entity; for another example, for each neighbor sample of w3, the electronic device determines, at the joint learning correlation layer, a weight of the neighbor sample relative to each entity (abbreviated as e, such as ei, ej, ek, and el) in the knowledge graph learning layer to obtain 20 weights, and determines a knowledge graph semantic representation of the target training sample according to the 20 weights and the knowledge graph semantic representation of each entity.

In the present embodiment, the knowledge graph is used to improve the natural language representation learning. From the perspective of natural language representation learning, this method has a wider range of knowledge use and a more effective way of knowledge use. Through joint modeling of the representation learning, the method can synthetically use points, edges, and knowledge about a topological structure composed of points and edges to improve effects of the natural language representation learning.

In the embodiments discussed above, the electronic device determines, at the joint learning correlation layer, the knowledge graph semantic representation for the target training object from M different perspectives. At this time, when determining, at the joint learning correlation layer, the weight of the target training sample relative to each entity in the knowledge graph learning layer, for each entity in the knowledge graph learning layer, the electronic device determines, at the joint learning correlation layer, M weights of the target training sample relative to the entity, where M≥1 and M is an integer.

Exemplarily, an example is taken where neighbor samples of the target training sample are integrated as one piece of integrated information. After the integrated information reaches the joint learning correlation layer, the electronic device determines, at the joint learning correlation layer, the weight of the integrated information relative to each entity (abbreviated as e, such as ei, ej, ek, and el) in the knowledge graph learning layer from M perspectives, to obtain 5M weights. The knowledge graph semantic representation of the target training sample is determined according to the 5M weights and the knowledge graph semantic representation of each entity.

In order to realize the determination of the knowledge graph semantic representation for the target training object from M different perspectives, it can be achieved by means of the read write mechanism of the joint learning correlation layer. Exemplarily, the joint learning correlation layer is composed of one or more read write mechanisms. The most commonly used read write mechanism is the attention mechanism, one or multiple attention modules can be used for the joint learning correlation layer, FIG. 2 shows the adoption of M attention modules. The attention module can also be named as a read write module. When multiple attention modules are adopted, the number of pieces of data learned by using the knowledge graph, such as the number of weights relative to each entity is equal to the number of attention modules. For example, for the case where the knowledge graph learning layer uses a graph neural network, the graph neural network needs to run M times to obtain M versions of knowledge graph data for the attention mechanism to access. For another example, for the case where the knowledge graph learning layer does not use any neural network module, only M copies of the same data structure, which is the list of points and edges, need to be maintained. In this way, through M versions of attention mechanisms, these M copies of the same data structure, which is the list of points and edges, will learn the knowledge graph semantic representations from different perspectives.

In the present embodiment, the knowledge graph can be learned differently through multiple attention mechanisms to obtain knowledge graph semantic representations of the target training sample from multiple perspectives. The knowledge graph semantic representations from the multiple perspectives and multiple neighbor samples are used to predict the target training sample, so as to improve the accuracy of prediction.

It should be noted that the quantity of training samples in the embodiment of the present application is extremely large, and quantity of neighbor training samples of a target training sample can be 4 or more. Similarly, the number of entities in the knowledge graph learning layer is also tremendous, the ei, ej, ek, and el discussed above are just examples. In actual implementation, the number of entities is tens of thousands or even more.

After obtaining a knowledge graph semantic representation of the target training sample, the electronic device determines a training result of the target training sample according to the knowledge graph semantic representation and the neighbor samples of the target training sample, that is, predicts the target training sample. For example, in FIG. 2, the knowledge graph semantic representations of w1, w2, w4, w5, and w3 are known, and predict which word or character is w3.

It should be noted that an example is taken in the above description where w1, w2, w4, and w5 are known and w3 is unknown so as to describe the embodiments of the present application in detail. However, the embodiments of the present application are not limited thereto, and other feasible implementations include but are not limited to: a) the preceding words are known, predict the current word, for example, w1 and w2 are known, predict w3; b) the preceding and following words are known, predict the current word, for example, w1, w2, w4, w5 are known, predict w3; c) predict whether two sentences, that is, whether two sequences of words are adjacent sentences or not; d) the preceding words are known, predict the current multiple words, that is, the sentence, for example, w1, w2, and w3 are known, predict w4 and w5.

In the embodiments discussed above, after a weight of the target training object relative to each entity in the knowledge graph learning layer is obtained, when determining a knowledge graph semantic representation of the target training sample according to the weight of each entity, for each entity in the knowledge graph learning layer, the electronic device processes the knowledge graph semantic representation of the entity according to the weight corresponding to the entity to obtain multiple processed knowledge graph semantic representations, and determines the knowledge graph semantic representation of the target training sample according to the multiple processed knowledge graph semantic representations.

Exemplarily, an example is taken where one attention module is used for the joint learning correlation layer. The electronic device integrates the neighbor samples of w3, such as w1, w2, w4, w5, etc. to obtain integrated information, inputs the integrated information to the joint learning correlation layer, determines, at the joint learning correlation layer, a weight of the integrated information relative to each entity (abbreviated as e, such as ei, ej, ek, and el) in the knowledge graph learning layer, and multiplies each entity's knowledge graph semantic representation with the corresponding weight to obtain five processed knowledge graph semantic representations, and then performs a sum operation on the five processed knowledge graph semantic representations to obtain the knowledge graph semantic representation of the target training sample. In addition, besides multiplication and addition operations, other operation may also be used, which is not limited in the embodiments of the present application.

In the present embodiment, the purpose of determining the knowledge graph semantic representation of the target training sample is realized.

Second, improve the knowledge graph learning layer by means of the natural language learning layer.

In a feasible design, after determining the training result of the target training sample according to the knowledge graph semantic representation and the neighbor sample, the electronic device is further configured to optimize the knowledge graph semantic representation of each of the multiple entities contained in the knowledge graph learning layer according to the training result.

Exemplarily, in the embodiment of the present application, after the natural language learning layer is improved by means of the knowledge graph learning layer, the semantic representation of each entity in the knowledge graph learning layer also can be optimized according to the training results of the target training sample.

In the present embodiment, the purpose of improving the knowledge graph learning layer by means of the natural language learning layer is realized. From the perspective of knowledge graph identification learning, according to this method, the knowledge graph identification learning process can be coordinated and optimized by means of a training process of natural language representation learning, and assistance and supplement are made to a learning process of the knowledge graph representation learning itself, thereby facilitating to learn a better knowledge graph representation.

When the natural language learning layer is used to improve the knowledge graph learning layer, the electronic device determines whether the training result of the target training object is correct or not: if the training result is correct, an excitation signal is generated, and the knowledge graph semantic representation of each of the multiple entities contained in the knowledge graph learning layer is enhanced according to the excitation signal; if the training result is wrong, a penalty signal is generated, and the knowledge graph semantic representation of each of the multiple entities contained in the knowledge graph learning layer is impaired according to the penalty signal.

Exemplarily, please refer to FIG. 2 again, after w3 is predicted with the knowledge graph language representations of neighbor samples w1, w2, w4, w5 and w3, the electronic device determines whether the training result of w3 is correct or not, that is, whether it correctly predicts or not with regard to which word or character is w3, if the training result is correct, an excitation signal is generated and fed back to the knowledge graph learning layer, so that the electronic device enhances, at the knowledge graph learning layer, the knowledge graph semantic representations of entities ei, ej, ek, and el; if the training result is wrong, it means that the knowledge graph semantic representations of the entities ei, ej, ek, and el in the knowledge graph learning layer may be wrong. At this time, the electronic device generates a penalty signal and feeds it back to the knowledge graph learning layer, so that the electronic device adjusts, at the knowledge graph learning layer, the semantic representation of each of the multiple entities contained in the knowledge graph learning model.

In the present embodiment, the purpose of improving the knowledge graph learning layer by means of the natural language learning layer is realized.

Hereinafter, how to drive the training of the joint learning model will be described in detail.

In an implementation, the entire joint learning model can be learned under the driving of the natural language learning layer.

Exemplarily, the natural language learning layer adopts commonly used language model learning strategies, including but not limited to: a) the preceding words are known, predict the current word, for example, w1 and w2 are known, predict w3; b) the preceding and following words are known, predict the current word, for example, w1, w2, w4, w5 are known, predict w3; c) predict whether two sentences, that is, whether two sequences of words are adjacent sentences or not; d) the preceding words are known, predict the current multiple words, that is, the sentence, for example, w1, w2, and w3 are known, predict w4 and w5. The natural language learning layer is driven by the language model learning strategies discussed above, and further the learning of the knowledge graph learning layer is driven through the bridge function of the joint learning correlation layer, so that a natural semantic representation of a natural language word and a knowledge graph semantic representation of points and edges in the knowledge graph can be learned synchronously. In addition, when users only use the joint learning model as a language model, the knowledge graph learning layer can be regarded as an external knowledge base of the natural language learning layer, and the entire joint learning model can be regarded as a knowledge-enhanced language model.

In another implementation, an upper task can also be used to drive the training of the joint learning model. The upper task refers to cognitive intelligence tasks at the natural language learning layer, such as reading comprehension, problem systems, and machine translation, etc. In specific implementation, it can be realized by taking the representation of words in the natural language learning layer as the input of the uppermost driving task. In this way, driven by the uppermost cognitive task, the parameters of the upper task itself, the parameters of the natural language learning layer, the parameters of the joint learning correlation layer, and the parameters of the knowledge graph learning layer can all be learned synchronously. On this basis, it is also possible to further introduce knowledge graph tasks to help driving the learning of the entire joint learning model, such as knowledge base completion, knowledge base question answering, and other knowledge reasoning tasks to perform optimization learning of the knowledge graph representation part. In this case, a multi-task learning or multi-objective learning strategy can be used to collaboratively optimize the optimization goal of the knowledge graph and the optimization goal of the cognitive intelligence task.

In the embodiment discussed above, by jointly modeling the knowledge graph representation learning and natural language representation learning processes, it is possible to use the correlation between the elements composed of the knowledge graph and the elements composed of the natural language to learn a better knowledge graph semantic representation and natural language semantic representation.

It should be noted that in the embodiment discussed above, the knowledge graph not only includes the fact knowledge graph in the traditional sense, but also includes special knowledge graph types such as a concept graph, a point of interest graph, and an event graph. Correspondingly, the points in the knowledge graph include, but not limited to information such as entities, concepts, interests, and time. The edges include, but not limited to correlation such as attributes, subordinations, timing sequences, and causalities.

The foregoing describes the specific implementation of text processing based on the natural language and the knowledge graph mentioned in the embodiments of the present application. The following are device embodiments of the present application, which can be used to implement the method embodiments of this application. For details not disclosed in the device embodiments of the present application, please refer to the method embodiment of the present application.

Figure 3:
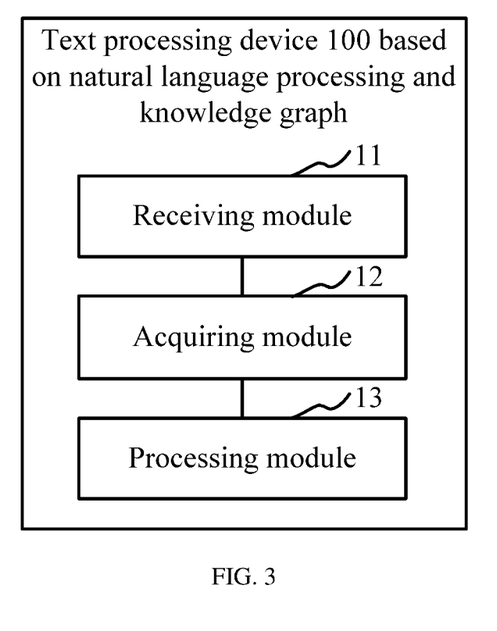
FIG. 3 is a schematic structural diagram of a text processing device based on a natural language and a knowledge graph according to an embodiment of the present application.

FIG. 3 is a schematic structural diagram of a text processing device based on a natural language and a knowledge graph according to an embodiment of the present application. The device can be integrated in an electronic device or implemented by an electronic device, and the electronic device can be a terminal device or a server. As shown in FIG. 3, in the present embodiment, the text processing device 100 based on the natural language and the knowledge graph may include:

a receiving module 11, configured to receive a text processing request input by a user, where the text processing request is used to request that a text be processed according to a semantic representation of a prediction object in the text;

an acquiring module 12, configured to input the prediction object into a pre-trained joint learning model to obtain the semantic representation of the prediction object, where the joint learning model is used for knowledge graph representation learning and natural language representation learning, and the semantic representation is obtained by the joint learning model by combining the knowledge graph representation learning and the natural language representation learning; and a processing module 13, configured to process the text according to the semantic representation.

Figure 4:
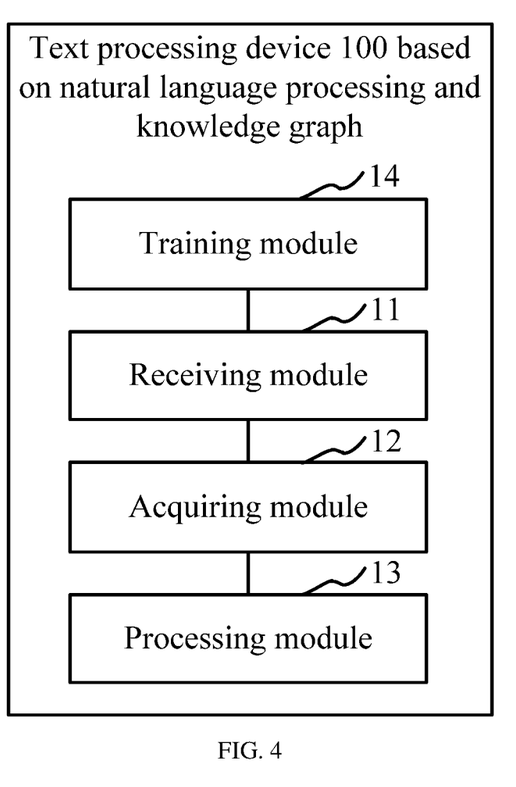
FIG. 4 is a schematic structural diagram of another text processing device based on a natural language and a knowledge graph according to an embodiment of the present application.

FIG. 4 is a schematic structural diagram of another text processing device based on a natural language and a knowledge graph according to an embodiment of the present application. On the basis of FIG. 4, the text processing device 100 based on the natural language and the knowledge graph discussed above further includes:

a training module 14, configured to: before the receiving module 11 receives the text processing request input by the user, perform training on training samples to obtain the joint learning model, where the joint learning model includes a natural language learning layer, a joint learning correlation layer and a knowledge graph learning layer, and the joint learning correlation layer is used to correlate the knowledge graph learning layer with the natural language learning layer.

In a feasible design, the training module 14 is configured to: determine, at the natural language learning layer, a neighbor sample of a target training sample in the training samples; determine, at the joint learning correlation layer, a weight of the target training sample relative to each entity in the knowledge graph learning layer according to the neighbor sample; determine a knowledge graph semantic representation of the target training sample according to the weight of each entity; and determine a training result of the target training sample according to the knowledge graph semantic representation and the neighbor sample.

In a feasible design, when determining, at the joint learning correlation layer, the weight of the target training sample relative to each entity in the knowledge graph learning layer, for each entity in the knowledge graph learning layer, the training module 14 determines, at the joint learning correlation layer, M weights of the target training sample relative to the entity, where M≥1 and M is an integer.

In a feasible design, when determining the knowledge graph semantic representation of the target training sample according to the weight of each entity, for each entity in the knowledge graph learning layer, the training module 14 processes the knowledge graph semantic representation of the entity according to the weight corresponding to the entity to obtain multiple processed knowledge graph semantic representations, and determines the knowledge graph semantic representation of the target training sample according to the multiple processed knowledge graph semantic representations.

In a feasible design, after determining the training result of the target training sample according to the knowledge graph semantic representation and the neighbor sample, the training module 14 is further configured to optimize the knowledge graph semantic representation of each of the multiple entities contained in the knowledge graph learning layer according to the training result.

In a feasible design, the training module 14 is specifically configured to: determine whether the training result is correct or not; generate an excitation signal if the training result is correct, and enhance the knowledge graph semantic representation of each of the multiple entities contained in the knowledge graph learning layer according to the excitation signal; and generate a penalty signal if the training result is wrong, and adjust the knowledge graph semantic representation of each of the multiple entities contained in the knowledge graph learning layer according to the penalty signal.

The device provided in the embodiment of the present application can be used in the method executed by the electronic device in the embodiments discussed above, and its implementation principle and technical effect are similar thereto, and will not be repeated here.

According to embodiments of the present application, the present application also provides an electronic device and a readable storage medium.

Figure 5:
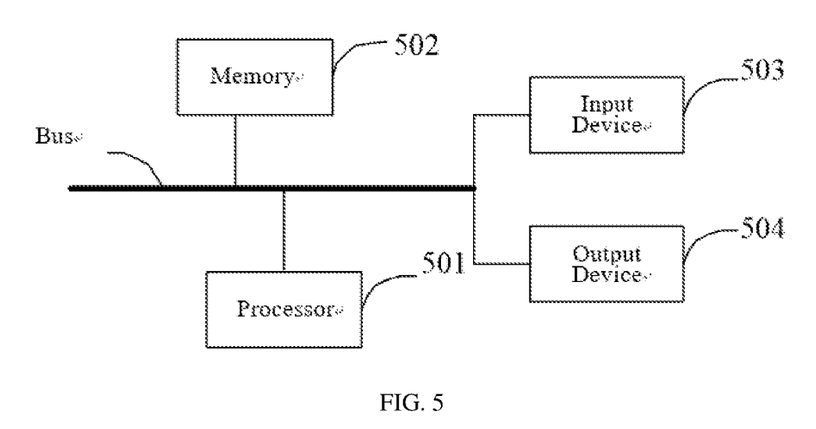
FIG. 5 is a block diagram of an electronic device configured to implement the text processing method based on the natural language and the knowledge graph according to the embodiment of the present application.

FIG. 5 is a block diagram of an electronic device used to implement the text processing method based on the natural language and the knowledge graph in the embodiment of the present application. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital assistant, cellular phones, smart phones, wearable devices, and other similar computing devices. The components shown herein, their connections and relationships, and their functions are merely examples, and are not intended to limit implementations of the present application described and/or required herein.

As shown in FIG. 5, the electronic device includes: one or more processors 501, a memory 502, and interfaces for connecting various components, including a high-speed interface and a low-speed interface. The various components are connected to each other with different buses, and can be installed on a common motherboard or installed in other ways as required. The processor may process instructions executed in the electronic device, including instructions stored in or on the memory to display graphical information of the GUI on an external input/output device (such as a display device coupled to the interface). In other implementations, if necessary, multiple processors and/or multiple buses can be used with multiple memories. Similarly, multiple electronic devices can be connected, and each device provides some necessary operations (for example, as a server array, a group of blade servers, or a multi-processor system). In FIG. 5, one processor 501 is used as an example.

The memory 502 is the non-transitory computer-readable storage medium provided in the present application. The memory is stored with instructions executable by at least one processor to enable the at least one processor to execute the text processing method based on the natural language and the knowledge graph provided in the present application. The non-transitory computer-readable storage medium in the present application is stored with computer instructions, and the computer instructions are configured to enable a computer to execute the text processing method based on the natural language and the knowledge graph provided in the present application.

As a kind of non-transitory computer-readable storage medium, the memory 502 can be used to store non-transitory software programs, non-transitory computer executable programs, and modules, such as the program instructions/modules (for example, the receiving module 11, the acquiring module 12, the processing module 13, and the training module 14 shown in FIG. 3 and FIG. 5) corresponding to the text processing method based on the natural language and the knowledge graph in the embodiments of the present application. The processor 501 executes various functional applications of the server and data processing by running non-transitory software programs, instructions, and modules stored in the memory 502, that is, implementing the text processing method based on the natural language and the knowledge graph in the method embodiment discussed above.

The memory 502 may include a program storage area and a data storage area, where the program storage area may have stored therein an operating system and an application program required by at least one function; the data storage area may have stored therein data created according to the use of the electronic device. In addition, the memory 502 may include a high-speed random access memory, and may also include a non-transitory memory, such as at least one magnetic disk storage device, flash memory device, or other non-transitory solid-state storage devices. In some embodiments, the memory 502 optionally includes remote memories arranged relative to the processor 501, and these remote memories may be connected to the electronic device through a network. Examples of the network discussed above include, but are not limited to, the Internet, corporate intranets, local area networks, mobile communication networks, and combinations thereof.

The electronic device for the text processing method based on the natural language and the knowledge graph may further include: an input device 503 and an output device 504. The processor 501, the memory 502, the input device 503, and the output device 504 may be connected through a bus or other ways. In FIG. 5, connections through buses are used as examples.

The input device 503 can receive inputted digital or character information, and generate key signal input related to user settings and function control of the electronic device, the input device including, such as a touch screen, a keypad, a mouse, a track pad, a touch pad, an indicator stick, one or more mouse buttons, a trackball, a joystick, etc. The output device 504 may include a display device, an auxiliary lighting device (e.g., LED), a tactile feedback device (e.g., a vibration motor), and etc. The display device may include, but is not limited to, a liquid crystal display (LCD), a light emitting diode (LED) display, and a plasma display. In some implementations, the display device may be a touch screen.

Various implementations of the systems and techniques described herein can be implemented in digital electronic circuit systems, integrated circuit systems, application specific integrated circuits (ASIC), computer hardware, firmware, software, and/or combinations thereof. These various implementations may include: being implemented in one or more computer programs, the one or more computer programs may be executed and/or interpreted on a programmable system including at least one programmable processor, where the programmable processor may be an application specific or general-purpose programmable processor, which can receive data and instructions from a storage system, at least one input device, and at least one output device, and transmit the data and instructions to the storage system, the at least one input device, and the at least one output device.

These computer programs (also called programs, software, software applications, or codes) include machine instructions of the programmable processor, and can be implemented using a high-level procedure and/or an object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) configured to provide machine instructions and/or data to the programmable processor, including a machine-readable medium that receives machine instructions as machine-readable signals. The term "machine-readable signal" refers to any signal used to provide machine instructions and/or data to the programmable processor.

In order to provide interaction with a user, the systems and techniques described here can be implemented on a computer which has: a display device (e.g., a cathode ray tube (CRT) or a liquid crystal display (LCD) monitor)) for displaying information to the user; and a keyboard and a pointing device (e.g., a mouse or a trackball), the user can provide input to the computer through the keyboard and the pointing device. Other types of devices can also be used to provide interaction with the user; for example, the feedback provided to the user can be any form of sensory feedback (e.g., visual feedback, auditory feedback, or tactile feedback); and the input from the user can be received in any form (including acoustic input, voice input, or tactile input).

The systems and technologies described herein can be implemented in a computing system that includes backstage components (e.g., as a data server), or a computing system that includes middleware components (e.g., an application server), or a computing system that includes front-end components (e.g., a user computer with a graphical user interface or a web browser, through which the user can interact with the implementations of the systems and technologies described herein), or a computing system that includes any combination of the backstage components, the middleware components, or the front-end components. The components of the system can be connected to each other through any form or medium of digital data communication (e.g., a communication network). Examples of the communication network include: a local area network (LAN), a wide area network (WAN), and the Internet.

The computing system may include a client and a server. The client and the server are generally far away from each other and normally interact through the communication network. The relationship between the client and the server is generated by computer programs running on a corresponding computer and having a client-server relationship.

An embodiment of the present application also provides a training method for a joint learning model. The joint learning model includes a knowledge graph learning layer and a natural language learning layer. The method includes: training the natural language learning layer by means of the knowledge graph learning layer, and improving the knowledge graph learning layer by using the trained natural language learning layer.

According to the technical solution in the embodiment of the present application, after receiving a text processing request input by a user, an electronic device inputs a prediction object in the text to a pre-trained joint learning model to learn a semantic representation of the prediction object, where the semantic representation is obtained by the joint learning model by combining knowledge graph representation learning and natural language representation learning, then the electronic device processes the text according to the semantic representation. In this process, since the semantic representation obtained by the electronic device using the joint learning model is obtained by the joint learning model by combining knowledge graph representation learning and natural language representation learning, it combines a knowledge graph representation learning and a natural language representation learning, compared to using only the knowledge graph representation learning or the natural language representation learning to learn the semantic representation of the prediction object, factors considered by the joint learning model are more in quantity and comprehensiveness, so accuracy of semantic representation can be improved, and thus accuracy of text processing can be improved. In addition, during training of the joint learning model, through joint modeling of knowledge graph representation learning and natural language representation learning processes, a correlation between elements composed of the knowledge graph and elements composed of the natural language can be used to learn a better knowledge graph semantic representation and natural language semantic representation.

It should be understood that the various forms of processes shown above can be used to reorder, add or delete steps. For example, the steps described in the present application can be executed in parallel, sequentially, or in a different order, as long as the desired result of the technical solution disclosed in the present application can be realized, and there is no limitation herein.

The specific implementations discussed above do not constitute a limitation on the protection scope of the present application. Those skilled in the art should understand that various modifications, combinations, sub-combinations and substitutions can be made according to design requirements and other factors. Any amendments, equivalent substitutions and improvements made within the spirit and principles of the present application shall be contained in the protection scope of the present application.

What is claimed is:

1. A text processing method based on natural language and a knowledge graph comprises:
   receiving a text processing request input by a user, wherein the text processing request is used to request that a text be processed according to a semantic representation of a prediction object in the text;
   inputting the prediction object to a joint learning model that has been pre-trained to obtain the semantic representation of the prediction object, wherein the joint learning model is used for knowledge graph representation learning and natural language representation learning, and the semantic representation is obtained by the joint learning model by combining the knowledge graph representation learning and the natural language representation learning; and
   processing the text according to the semantic representation;
   wherein before the receiving the text processing request input by the user, further comprising:
   performing training on training samples to obtain the joint learning model, wherein the joint learning model comprises a natural language learning layer, a joint learning correlation layer and a knowledge graph learning layer, and the joint learning correlation layer is used to correlate the knowledge graph learning layer with the natural language learning layer;
   wherein the performing the training on the training samples to obtain the joint learning model comprises:
   determining, at the natural language learning layer, a neighbor sample of a target training sample in the training samples;
   determining, at the joint learning correlation layer, a weight of the target training sample relative to each entity in the knowledge graph learning layer according to the neighbor sample;
   determining a knowledge graph semantic representation of the target training sample according to the weight of each entity; and
   determining a training result of the target training sample according to the knowledge graph semantic representation and the neighbor sample.

2. The method according to claim 1, wherein the determining, at the joint learning correlation layer, the weight of the target training sample relative to each entity in the knowledge graph learning layer comprises:
   for each entity in the knowledge graph learning layer, determining, at the joint learning correlation layer, M weights of the target training sample relative to the entity, wherein M1≥1 and M is an integer.

3. The method according to claim 2, wherein the determining the knowledge graph semantic representation of the target training sample according to the weight of each entity comprises:
   for each entity in the knowledge graph learning layer, processing the knowledge graph semantic representation of the entity according to the weight corresponding to the entity to obtain multiple processed knowledge graph semantic representations; and
   determining the knowledge graph semantic representation of the target training sample according to the multiple processed knowledge graph semantic representations.

4. The method according to claim 2, wherein after the determining the training result of the target training sample according to the knowledge graph semantic representation and the neighbor sample, further comprising:
   optimizing the knowledge graph semantic representation of each of multiple entities contained in the knowledge graph learning layer according to the training result.

5. The method according to claim 4, wherein the optimizing the knowledge graph semantic representation of each of the multiple entities contained in the knowledge graph learning layer according to the training result comprises:
   determining whether the training result is correct or not;
   generating an excitation signal if the training result is correct, and enhancing the knowledge graph semantic representation of each of the multiple entities contained in the knowledge graph learning layer according to the excitation signal; and
   generating a penalty signal if the training result is wrong, and adjusting the knowledge graph semantic representation of each of the multiple entities contained in the knowledge graph learning layer according to the penalty signal.

6. The method according to claim 1, wherein the determining the knowledge graph semantic representation of the target training sample according to the weight of each entity comprises:
   for each entity in the knowledge graph learning layer, processing the knowledge graph semantic representation of the entity according to the weight corresponding to the entity to obtain multiple processed knowledge graph semantic representations; and
   determining the knowledge graph semantic representation of the target training sample according to the multiple processed knowledge graph semantic representations.

7. The method according to claim 1, wherein after the determining the training result of the target training sample according to the knowledge graph semantic representation and the neighbor sample, further comprising:
   optimizing the knowledge graph semantic representation of each of multiple entities contained in the knowledge graph learning layer according to the training result.

8. A text processing device based on natural language and a knowledge graph, comprising:
   at least one processor; and
   a memory communicatively connected with the at least one processor;
   wherein the memory is stored with instructions executable by the at least one processor, and the instructions are executed by the at least one processor to enable the at least one processor to:
   receive a text processing request input by a user, wherein the text processing request is used to request that a text be processed according to a semantic representation of a prediction object in the text;
   input the prediction object into a joint learning model that has been pre-trained to obtain the semantic representation of the prediction object, wherein the joint learning model is used for knowledge graph representation learning and natural language representation learning, and the semantic representation is obtained by the joint learning model by combining the knowledge graph representation learning and the natural language representation learning; and
   process the text according to the semantic representation;
   wherein the at least one processor is further enabled to:
   perform training on training samples to obtain the joint learning model before receiving the text processing request input by the user, wherein the joint learning model comprises a natural language learning layer, a joint learning correlation layer and a knowledge graph learning layer, and the joint learning correlation layer is used to correlate the knowledge graph learning layer with the natural language learning layer;

wherein the at least one processor is further enabled to: determine, at the natural language learning layer, a neighbor sample of a target training sample in the training samples; determine, at the joint learning correlation layer, a weight of the target training sample relative to each entity in the knowledge graph learning layer according to the neighbor sample; determine a knowledge graph semantic representation of the target training sample according to the weight of each entity; and determine a training result of the target training sample according to the knowledge graph semantic representation and the neighbor sample.

9. The device according to claim 8, wherein the at least one processor is further enabled to:

determine, at the joint learning correlation layer, M weights of the target training sample relative to the entity when determining, at the joint learning correlation layer, the weight of the target training sample relative to each entity in the knowledge graph learning layer, for each entity in the knowledge graph learning layer, wherein M≥1 and M is an integer.

10. The device according to claim 9, wherein the at least one processor is further enabled to:

process the knowledge graph semantic representation of the entity according to the weight corresponding to the entity to obtain multiple processed knowledge graph semantic representations, and determine the knowledge graph semantic representation of the target training sample according to the multiple processed knowledge graph semantic representations when determining the knowledge graph semantic representation of the target training sample according to the weight of each entity, for each entity in the knowledge graph learning layer.

11. The device according to claim 9, wherein the at least one processor is further enabled to:

optimize the knowledge graph semantic representation of each of multiple entities contained in the knowledge graph learning layer according to the training result after determining the training result of the target training sample according to the knowledge graph semantic representation and the neighbor sample.

12. The device according to claim 8, wherein the at least one processor is further enabled to:

process the knowledge graph semantic representation of the entity according to the weight corresponding to the entity to obtain multiple processed knowledge graph semantic representations, and determine the knowledge graph semantic representation of the target training sample according to the multiple processed knowledge graph semantic representations when determining the knowledge graph semantic representation of the target training sample according to the weight of each entity, for each entity in the knowledge graph learning layer.

13. The device according to claim 8, wherein the at least one processor is further enabled to:

optimize the knowledge graph semantic representation of each of the multiple entities contained in the knowledge graph learning layer according to the training result after determining the training result of the target training sample according to the knowledge graph semantic representation and the neighbor sample.

14. The device according to claim 13, wherein the at least one processor is further enabled to: determine whether the training result is correct or not; generate an excitation signal if the training result is correct, and enhance the knowledge graph semantic representation of each of the multiple entities contained in the knowledge graph learning layer according to the excitation signal; and generate a penalty signal if the training result is wrong, and adjust the knowledge graph semantic representation of each of the multiple entities contained in the knowledge graph learning layer according to the penalty signal.

15. A non-transitory computer-readable storage medium stored with computer instructions, wherein the computer instructions are configured to enable a computer to execute the method of claim 1.

* * * * *